(12) United States Patent
Andersen et al.

(10) Patent No.: US 8,260,249 B2
(45) Date of Patent: Sep. 4, 2012

(54) METHOD AND APPARATUS OF POWER CONTROL FOR A PUBLIC WARNING SYSTEM

(75) Inventors: Niels Peter Skov Andersen, Roskilde (DK); David Williams, Malaga (ES)

(73) Assignee: QUALCOMM Incorporated, San Diego, CA (US)

( * ) Notice: Subject to any disclaimer, the term of this patent is extended or adjusted under 35 U.S.C. 154(b) by 748 days.

(21) Appl. No.: 12/211,513

(22) Filed: Sep. 16, 2008

(65) Prior Publication Data

US 2009/0130972 A1 May 21, 2009

Related U.S. Application Data

(60) Provisional application No. 60/973,142, filed on Sep. 17, 2007.

(51) Int. Cl.
*H04M 11/04* (2006.01)
(52) U.S. Cl. .............. 455/404.1; 455/458; 455/418; 455/466; 379/37
(58) Field of Classification Search ........... 455/404.2, 455/458, 466, 418, 404.1; 379/37
See application file for complete search history.

(56) References Cited

U.S. PATENT DOCUMENTS

| | | | | |
|---|---|---|---|---|
| 4,921,468 A | * | 5/1990 | Miwa | 398/106 |
| 2004/0192252 A1 | * | 9/2004 | Aerrabotu et al. | 455/404.1 |
| 2004/0203562 A1 | | 10/2004 | Kolsrud | |
| 2005/0037728 A1 | | 2/2005 | Binzel | |
| 2006/0187897 A1 | * | 8/2006 | Dabbs et al. | 370/349 |
| 2008/0194224 A1 | * | 8/2008 | Thorson et al. | 455/404.1 |
| 2008/0305763 A1 | * | 12/2008 | Wijayanathan et al. | 455/404.2 |
| 2009/0042546 A1 | * | 2/2009 | McClendon | 455/414.1 |

FOREIGN PATENT DOCUMENTS

| | | |
|---|---|---|
| CN | 1894949 A | 1/2007 |
| JP | 2001156663 A | 6/2001 |
| JP | 2004336227 A | 11/2004 |
| JP | 2010524315 A | 7/2010 |
| KR | 20060064623 A | 6/2006 |
| RU | 43675 U1 | 1/2005 |
| TW | 200726281 | 7/2007 |
| WO | WO9913439 A1 | 3/1999 |
| WO | WO2007058266 A1 | 5/2007 |

OTHER PUBLICATIONS

List of mobile country or geographical codes XP002509311 http://www.itu.int/itudoc/itu-t/ob-lists/icc/e212_685.pdf (position on Jan. 1, 2004).
International Search Report and Written Opinion—PCT/US2008/076713—ISA/EPO—Jan. 16, 2009.
Taiwan Search Report—TW097135644—TIPO—Apr. 25, 2012, Apr. 2012.

* cited by examiner

*Primary Examiner* — Danh Le
(74) *Attorney, Agent, or Firm* — Milan I. Patel; John J. Ketchum

(57) ABSTRACT

A method for broadcasting messages in a wireless communication system is provided. The method includes employing a paging channel to receive a broadcast event on a wireless device and utilizing the broadcast event to trigger a warning message on the device. For example, the broadcast event can be detected from a natural disaster such as a primary earthquake warning or tsunami.

19 Claims, 10 Drawing Sheets

METHOD AND APPARATUS OF POWER CONTROL FOR A PUBLIC WARNING SYSTEM

CROSS REFERENCE TO RELATED APPLICATIONS

This application claims the benefit of U.S. Provisional Patent Application No. 60/973,142, entitled METHOD AND APPARATUS OF POWER CONTROL FOR A PUBLIC WARNING SYSTEM, and filed on Sep. 17, 2007, the entirety of which is incorporated herein by reference.

BACKGROUND

I. Field

The following description relates generally to wireless communications systems, and more particularly to public warning systems and methods for wireless communication systems.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

An orthogonal frequency division multiplex (OFDM) communication system effectively partitions the overall system bandwidth into, multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wifeless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_s \leq \min\{N_T, N_R\}$. Generally, each of the NS independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

Such wireless systems can be employed for public service including the ability to broadcast warnings across wireless networks. For instance, there are interests in using cellular systems such as those specified by 3GPP for the purpose of a Public Warning System. However, the requirements from different regions of the world for such a public warning system are conflicting. For example, Japan has plans to utilize the system for Earthquake Warning, which requires a response time of less than five seconds, yet at the same time has limited requirement to the amount of data to be transferred. In other regions, the response time is less stringent but there is requirements transmission of significantly more data (e.g., maps, instructions, description of the event). To satisfy these less time constrained applications of Public Warning Systems, point-to-multipoint transmissions such as Cell Broadcast Service (CBS), Mobile Broadcast Multimedia Service (MBMS) or Mobile TV such as MediaFLO could be a usable solution. However these have two main drawbacks: first they are not likely to be able to provide the fast response time required for a Earthquake warning system; secondly it will require that the mobile station is configured for monitoring the relevant point-to-multipoint system and such a permanent monitoring will lead to a significant increase of the mobile stations standby power consumption.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods are provided to enable public warnings to be transmitted to mobile wireless devices in a timely manner yet conserve power consumption in the respective devices. A paging channel (or other channel employed to activate a mobile device) is utilized to receive public warnings such as are provided when a primary earthquake has been detected. A plurality of users can receive a fast wake-up signal via the paging channel alerting them and their devices that an event such as an earthquake has occurred. The paging channel warning can trigger a specified alarm sound or other signal (alarm vibration) in the device and employed to trigger the devices into listening mode where subsequent messages can be received. Subsequent messages can include instructions on how to respond or react to a particular warning. By employing the paging channel to activate me device in the event of a pubic warning, power can be conserved in the devices since the respective devices do not need to be in high-power monitoring mode to adequately receive or respond to the warnings in a suitable timeframe. After the devices have been activated to the warning via the paging channel, other systems such as cell broadcast services or mobile television can be employed to deliver more detailed information on how to proceed or respond.

To the accomplishment of the foregoing and related ends, certain illustrative aspects are described herein in connection with the following description and the annexed drawings. These aspects are indicative, however of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Systems and methods are provided to transmit event warnings while conserving power in a mobile wireless device. In an aspect, a method for broadcasting messages in a wireless communication system is provided. The method includes employing a paging channel to receive a broadcast event on a wireless device and utilizing the broadcast event to trigger a warning message, on the device. For example, the broadcast event can be detected from a natural disaster such as a primary earthquake warning or tsunami. The method also includes utilizing the broadcast event to place the wireless device in listen mode to receive subsequent data regarding the event, where the subsequent data can be broadcast via a cell broadcast service, mobile television, or mobile broadcast multimedia service, for example.

Furthermore, various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Figure 1:
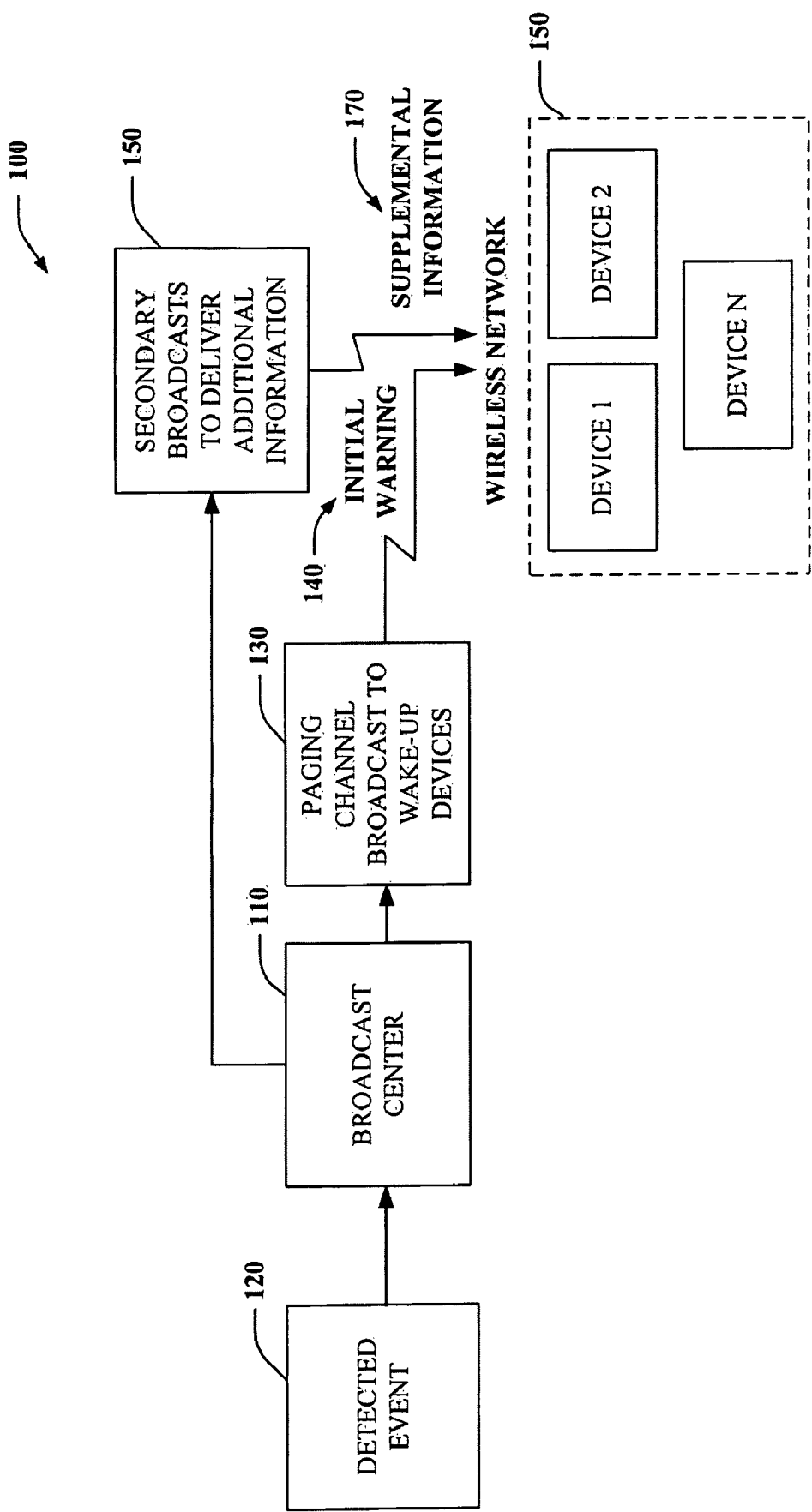
FIG. 1 is a high level block diagram of a system for broadcasting public messages across a wireless network of mobile devices.

Referring now to FIG. 1, a system 100 illustrates broadcasting public messages across a wireless network of mobile devices. The system 100 includes one or more broadcast centers 110 that can receive information from one or more detected events 120. Such events 120 can be related to substantially any type of activity that may be of interest to the public at large. For example, if an earthquake event 120 were to occur, a message could be broadcast by the broadcast centers 110 indicating the likelihood that subsequent or secondary earthquake events were to follow. Such warnings or events 120 could be triggered from substantially any type of activity including tsunami events, fire warnings, hurricanes and tornados, the outbreak of disease, volcanic eruption, other natural disasters, impending war, and other occurrences that may have broadcast value for the public and are needed in a timely or urgent manner. As shown, a paging channel 130 is employed to broadcast an initial warning 140 associated with the detected event 120 to a plurality of wireless devices 150. Such initial warning 140 is utilized to activate the devices 150 from their lower-power or dormant operating states. As more information is collected or available, a secondary broadcast 160 provides supplemental information 170 that can be transmitted to the devices over various channels that are described below.

In general, the system 100 enables public warnings to be transmitted to mobile (or non-mobile) wireless devices 150 in a timely manner yet conserve power consumption in the respective devices. The paging channel 130 or other channel employed to activate a mobile device 150 is utilized to receive public warnings such as are provided when a primary earthquake has been detected. A plurality of users can receive a fast wake-up signal or initial warning 140 via the paging channel 130 alerting them and their respective devices 150 that an event such as an earthquake has occurred. The paging channel warning 140 can trigger a specified alarm sound or other signal (alarm vibration) in the device 150 and employed to trigger the devices into listening mode where subsequent messages 170 can be received. Subsequent messages 170 can include instructions on how to respond or react to a particular warning. By employing the paging channel 130 to activate the devices 150 in the event of a public warning, power can be conserved in the devices since the respective devices do not need to be in high-power monitoring mode to adequately receive or respond to the warnings in a suitable timeframe. After the devices 150 have been activated to the warning via the paging channel 130, other systems such as cell broadcast services or mobile television can be employed to deliver more detailed information on how to proceed or respond.

In an exemplary aspect, messages received on the paging channel 130 are employed to deliver an urgent message to the cell-phone device 150 (and/or other device in a Personal Area Network) and the same message can also enable Cell Broadcast Service (CBS), Mobile Broadcast Multimedia Service, (MBMS), Digital Video Broadcast Handheld (DVB-H), or mobile TV in the phone or device for example.

To overcome the problem of having the device 150 in high-power listen mode at all times in order to respond quickly enough to a detected event 120, a message can be added to the paging channel 130 which acts as a Warning Indicator for the public warning indicator. The Warning Indicator can be transmitted in all paging groups/blocks for a predetermined period. This Warning Indicator can have a dual functionality—it can have the capability of directly transmitting different types of specific warnings, e.g., Earthquake Warning, in addition it can transmit a warning wake up signal 140 which informs the mobile device 150 that public warning system information is transmitted as well as a pointer to where the more detailed information 170 is transmitted, e.g., Cell Broadcast Service, MBMS, Mobile TV and so forth. The mobile device 150 reacts to the wake up signal 140 by providing ah alarm (e.g., audio, visual, vibration) to the user on the device and/or other device in the user's Personal Area Network. An advantage of this solution is that the mobile station monitors the paging channel 130 anyway and with a frequency higher than what is needed to fulfill the tight requirement for response time for an Earthquake Warning, for example, and thus this monitoring will not lead to an increase in power consumption in the mobile station, and will actually allow the mobile station to listen to the carrier of the detailed warning when there actually is more information available.

In an aspect, the Warning Indicator on the paging channel 130, at least two principle options exist including a dedicated message or transmission of the indicator in an existing, paging message. For the transmission of the indicator with an existing paging message, a unique Mobile Country Code (MCC) and Mobile Network Code (MNC) combination can be used, e.g., 901-008 which already has been allocated for Global System for Mobile communications (GSM) emergency call handling for Support of Localized Service Area (SoLSA). The information is then encoded in the remaining portion of the mobile International Mobile Subscriber Identity (IMSI) message, one portion of the message containing the immediate warning, e.g., Earth Quake, the other portion containing a pointer to the carrier of the Public Warning System alert information.

It is noted that the system 100 can be employed with an access terminal or mobile device, and can be, for instance, a module such as an SD card, a network card, a wireless network card, a computer (including laptops, desktops, personal digital assistants PDAs), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can bean access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
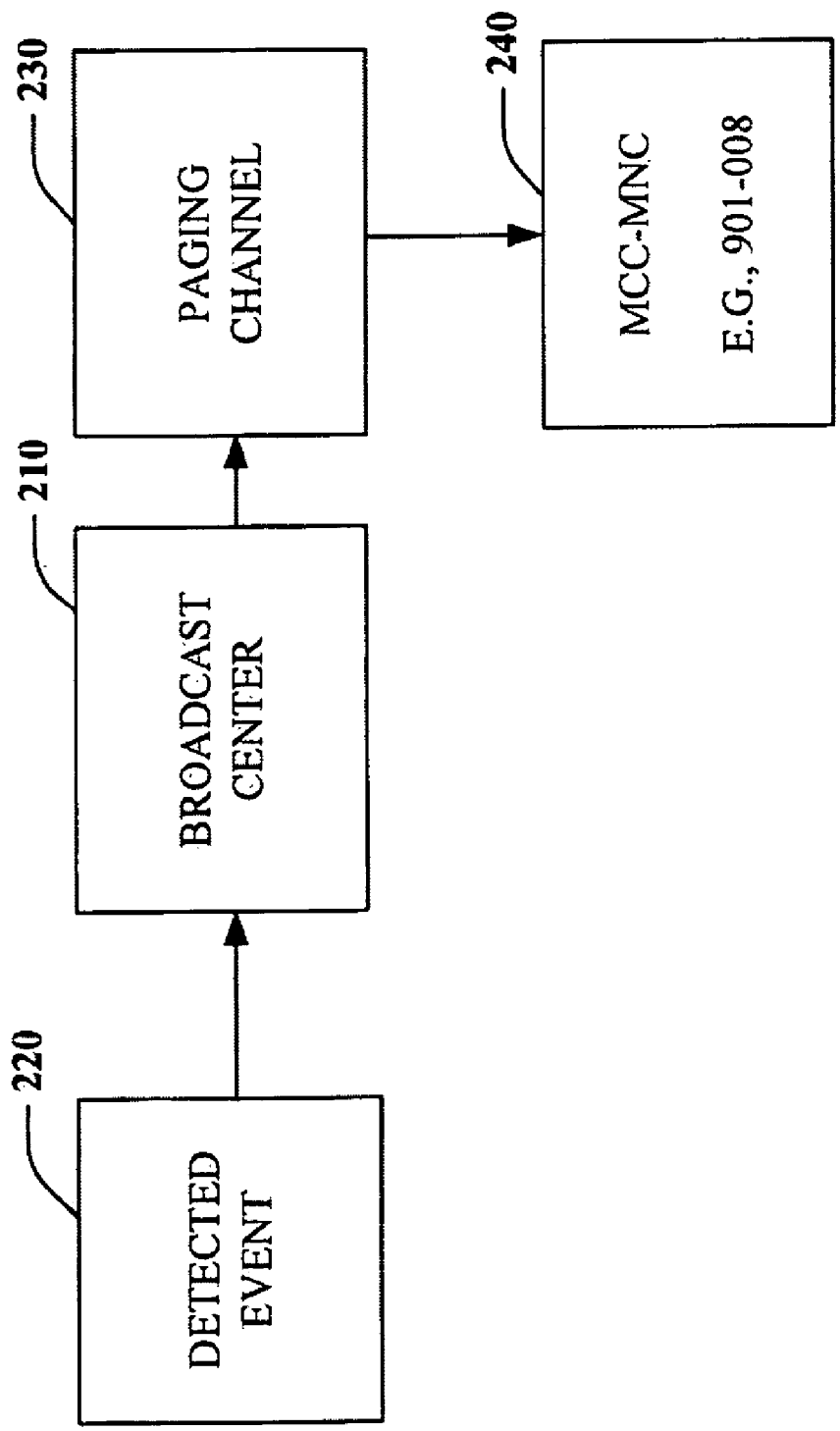
FIG. 2 is a block diagram of a system that employs a paging channel for a public warning system.

Turning to FIG. 2, example protocol paging channel system 200 and implementation is provided for the system described above with respect to FIG. 1. Similar to above, the system 200 includes one or more broadcast centers 210 that can receive information from one or more detected events 220. Such events 220 can be related to substantially any type of activity that may be of interest to the public at large. A paging channel 230 is employed to broadcast an initial warning associated with the detected event 220 to a plurality of wireless devices (not shown). As shown, the paging channel employs a Mobile Country Code (MCC) and Mobile Network Code (MNC) component 140. A Mobile Network Code (MNC) is used in combination with a Mobile Country Code (MCC) (also known as a "MCC/MNC tuple") to uniquely identify a mobile phone operator/carrier using a GSM, CDMA, iDEN, TETRA and UMTS public land mobile networks and some satellite mobile networks. An example MCC/MNC combination that all devices would respond to is 901 for the MCC and 08 for the MNC. This particular MCC/MNC of 901-08 is reserved for station identification where the mobile does not have a subscription IMSI. Thus, since a subscription is not required, any mobile wireless device is able to receive the respective warning. Thus, for 901-08, a subscriber IMSI (International Mobile Subscriber Identity) (a unique 15-digit code used to identify ah individual user oh a GSM network) is not required to respond to or receive a respective warning.

Figure 3:
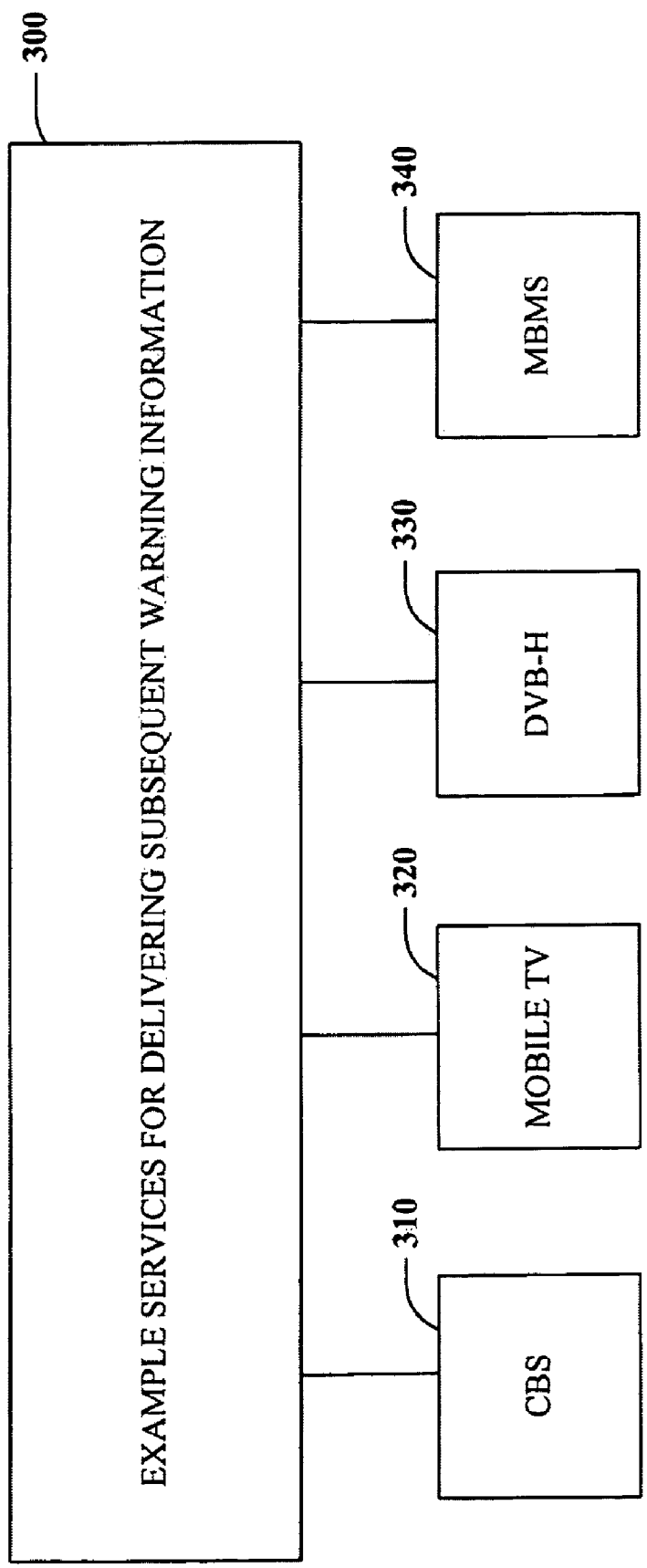
FIG. 3 is a block diagram of example services for delivering public warnings over a wireless network.

Referring to FIG. 3, example service 300 are illustrated for delivering supplemental information to wireless devices that have been activated via the paging channel components described above. In one aspect, the services 300 include a Cell Broadcast Service or CBS 310. The Cell Broadcast Service 310 allows systems to send cell broadcast messages to the mobile station that are transmitted at a defined repetition interval. This enables the mobile station to receive the message even if entering the cell after the first transmission. The cell broadcast messages can be from one to fifteen pages in length, and are transmitted by the test set until the cell broadcast service is disabled or the state of the message(s) being transmitted is set to OFF. Generally, all messages sent from the set are automatically segmented into the minimum number of pages possible. Cell broadcast messages contain a page parameter that indicates to the mobile station the number of the current page being received as well as the total number of pages in the message. The message set can transmit up to three different messages at a time using the Cell Broadcast Service. If the Cell Broadcast Service is configured to transmit multiple messages, the messages are sent in sequential order at a rate of one page every multi-frame until all the pages in the enabled messages are transmitted. The messages are retransmitted at specified intervals, which are set by the repetition period.

In another example service for delivering information associated with a warning, a mobile television (TV) service 320 can be provided. Mobile TV is a generic term used to describe the delivery of video content to a mobile phone handset. Mobile TV users can watch programs they know including sports events, favorite shows, newscasts, and so forth wherever they may be located due to the combination of the portability of their handset and wireless delivery mechanisms. In this case, the Mobile TV service would be used to deliver additional warning information as opposed to entertainment content or other data. In yet another example, a handheld digital video broadcast (DVB-H) may be employed to deliver warning content. To date, DVB-H has finalized the specification of open systems interconnection (OSI) layers 1 and 2, and the DVB convergence of the broadcast and mobile services. A CBMS group recently began specifying the protocols and codecs above IP. It is likely that the group will adopt major parts of 3GPP MBMS. Some challenges associated with DVB-H are network requirements and related deployment costs for providing coverage comparable to that of mobile networks.

In another service example, a Mobile Broadcast Multimedia Service (MBMS) 340 can be provided. The MBMS 340 provides a set of features for mobile networks, these features include a set of functions that control the broadcast/multicast delivery service. Another feature includes broadcast/multicast routing of data flows in the core network and efficient radio bearers for point-to-multi-point radio transmission within a cell. In addition, can specify protocols and media codecs for the delivery of multimedia data. Few of the protocols and the media codecs are new features; instead, they are generally "shared" with other services much like on-demand unicast streaming. It is noted that the example services are but one manner in which to deliver information in association with a public warning on a wireless network. It is to be appreciated that substantially any service or data exchange that can deliver information content in a timely manner over the wireless network can be employed. Similarly, although paging channels are described as a mechanism for waking up a wireless device, it is to be appreciated that substantially any signal that is utilized to activate or notify a wireless device of an impending warning can be similarly employed.

Figure 4:
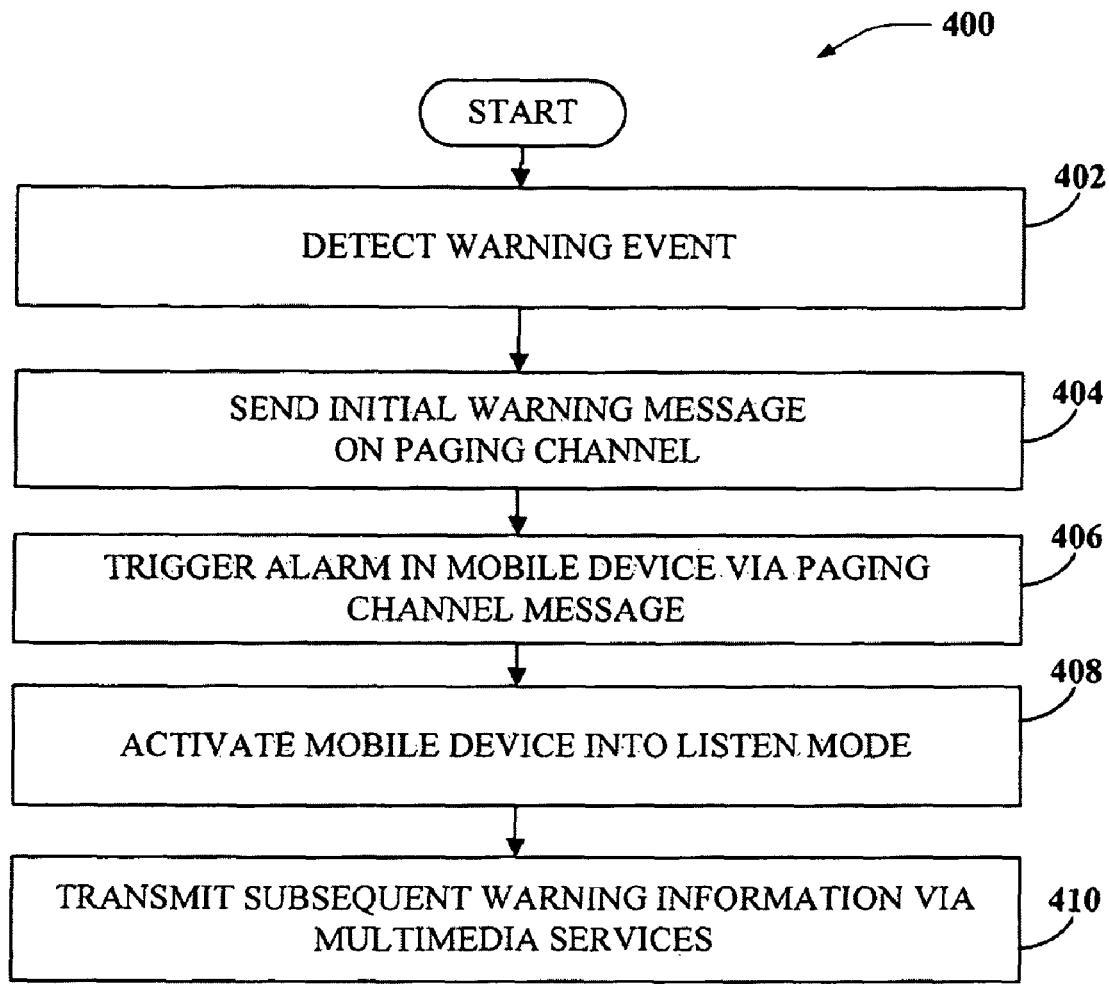
FIG. 4 illustrates an exemplary method that employs a paging channel to initiate public warnings over a wireless network.

Referring now to FIG. 4, a wireless communications methodology is illustrated for public warning systems. While, for purposes of simplicity of explanation, the methodology is shown and described as a series of acts, it is to be understood and appreciated that the methodology is not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

FIG. 4 illustrates a method 400 for generating warnings and subsequent warning information in a wireless communications network. Proceeding to 402, an initial warning event is detected. As noted previously, such events can be related to natural disasters or other occurrences that the public may need to be alerted. At 404, a paging channel (or other channel employed to activate a mobile device) is utilized to generate public warnings (from a broadcast center) such as are provided when a primary earthquake has been detected. A plurality of users can receive a fast wake-up signal via the paging channel alerting them and their devices that an event such as an earthquake has occurred. At 406, the paging channel warning triggers a specified alarm sound or other signal (alarm vibration) in the device to initially wake-up the device and alert the user. At 408, the paging channel warning is employed to trigger the devices into listening mode where subsequent messages can be received. At 410, after the devices have been activated by the paging channel warning, subsequent messages and information is provided that can include instructions on how to respond or react to a particular warning. As noted previously, by employing the paging channel to activate the device in the event of a public warning, power can be conserved in the devices since the respective devices do not need to be in high-power monitoring mode to adequately receive or respond to the warnings in a suitable timeframe. After the devices have been activated to the warning via the paging channel, other systems such as cell broadcast services, mobile television, or multimedia services can be employed to deliver more detailed information on how to proceed or respond.

The techniques described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Figure 5:
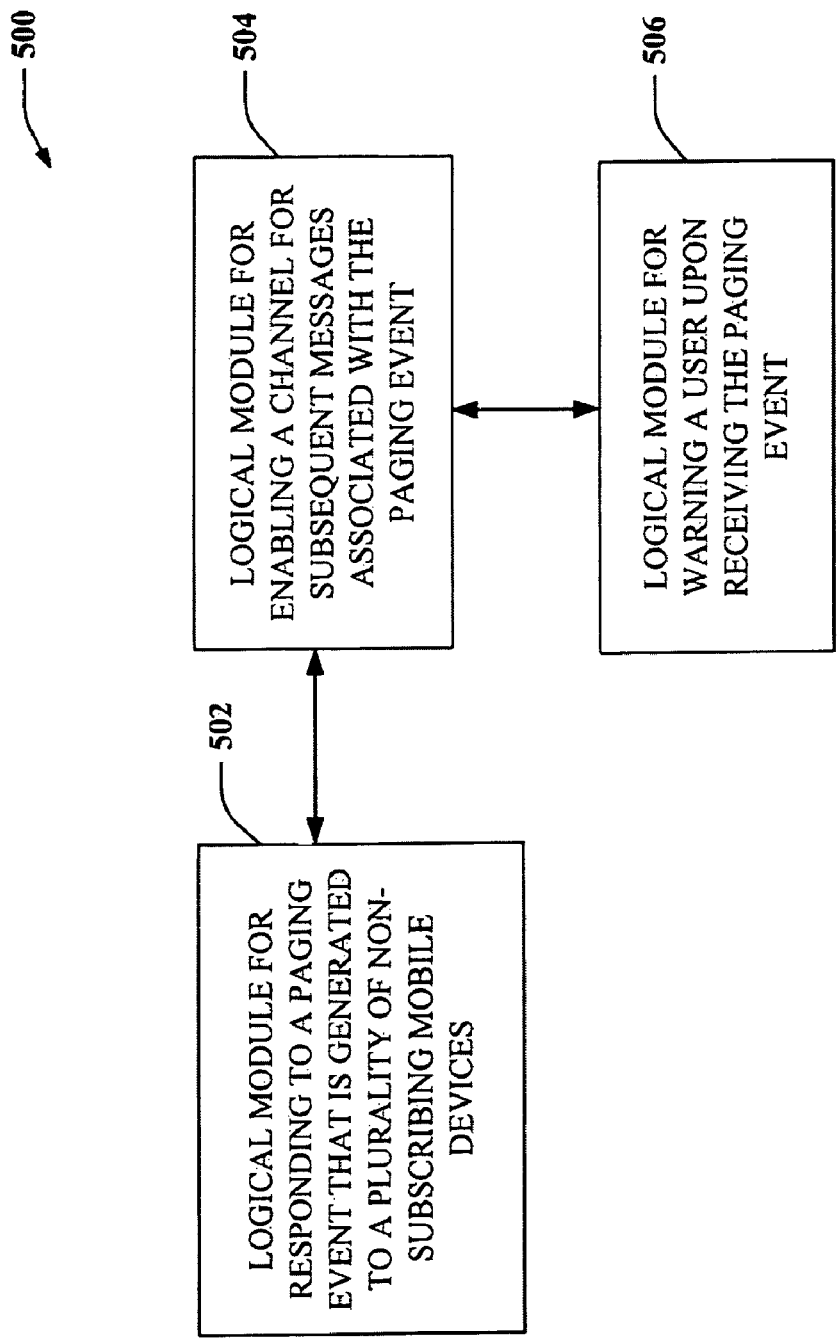
FIG. 5 illustrates an example logical module for public warning systems.
Figure 6:
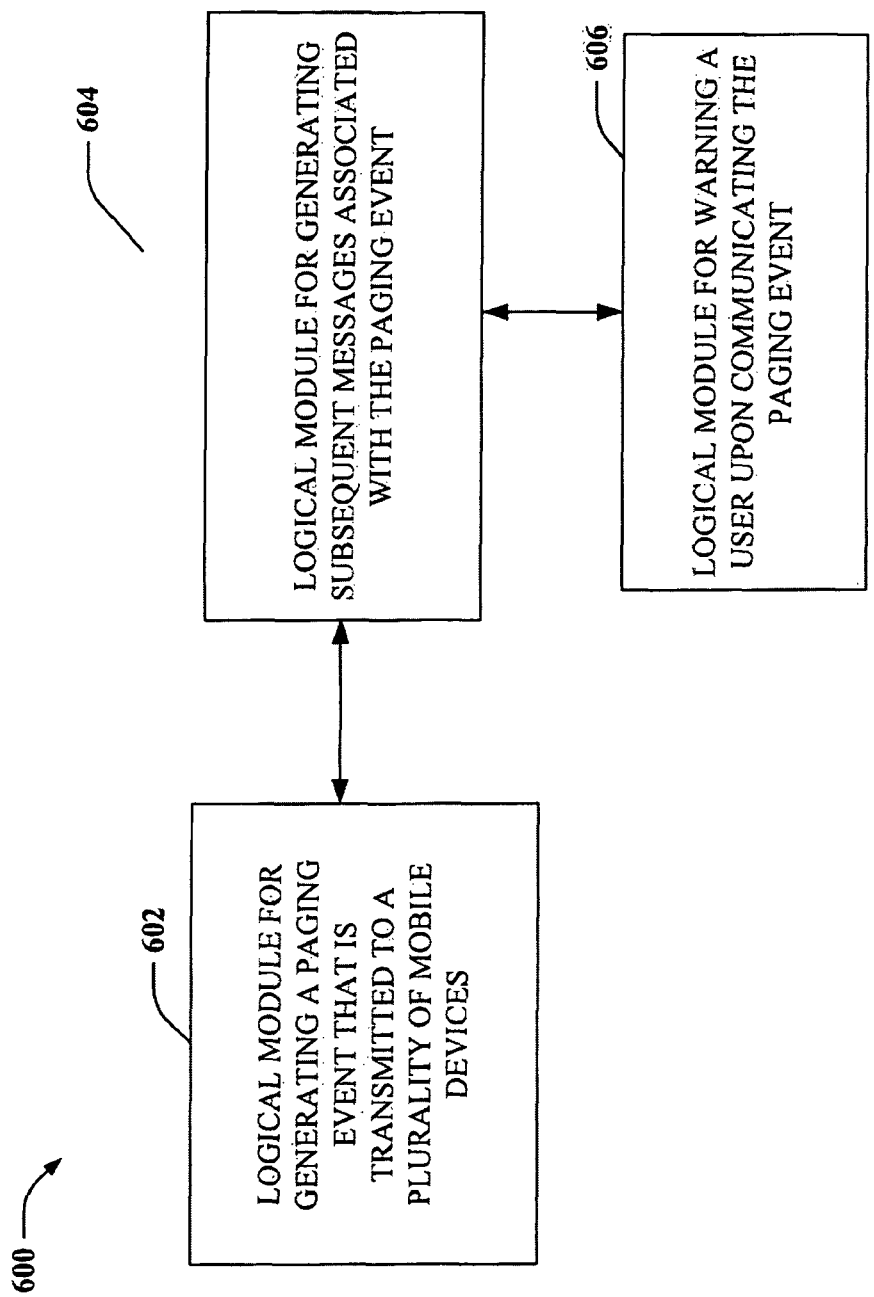
FIG. 6 illustrates an example logical module for wireless communications.

Turning now to FIGS. 5 and 6, a system is provided that relates to wireless signal processing. The systems are represented as a series of interrelated functional blocks, which can represent functions implemented by a processor, software, hardware, firmware, or any suitable combination thereof.

Referring to FIG. 5, a wireless communication device 500 is provided. The device 500 includes a logical module 502 means for responding to a paging event that is generated to a plurality of non-subscribing mobile devices. This also includes a logical module 504 for enabling a channel for subsequent messages associated with the paging event. The device 500 also includes a logical module 506 for warning a user upon receiving the paging event.

Referring to FIG. 6, a wireless communication system 600 is provided. The system includes a logical module 602 for generating a paging event that is transmitted to a plurality of mobile devices and a logical module 604 for generating subsequent messages associated with the paging event. The system 600 also includes a logical module 606 for warning a user upon communicating the paging event.

Figure 7:
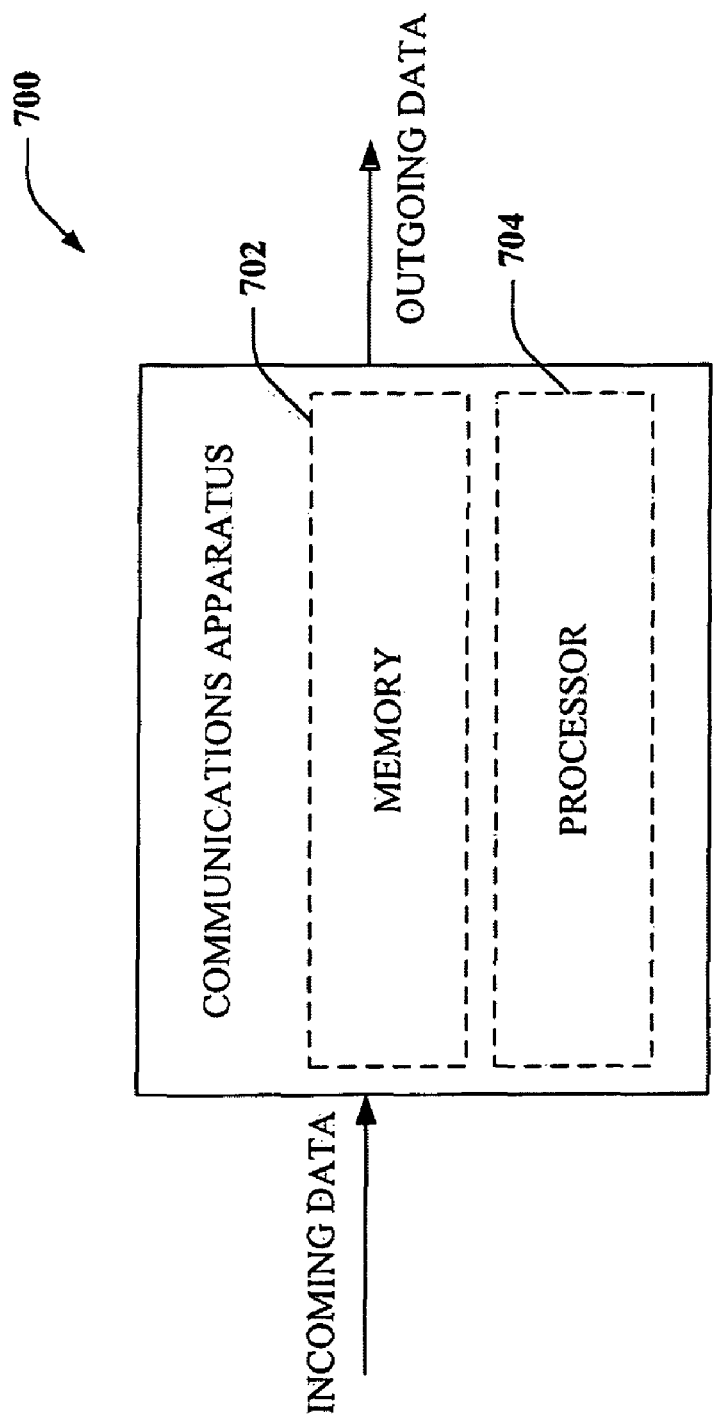
FIG. 7 illustrates an example communications apparatus for a wireless public warning system.

FIG. 7 illustrates a communications apparatus 700 that can be a wireless communications apparatus, for instance, such as a wireless terminal. Additionally or alternatively, communications apparatus 700 can be resident within a wired network. Communications apparatus 700 can include memory 702 that can retain code (also referred to as instructions) for performing a signal analysis in a wireless communications terminal. Additionally, communications apparatus 700 may include a processor 704 that can execute instructions within memory 702 and/or instructions received from another network device, wherein the instructions can relate to configuring or operating the communications apparatus 700 or a related communications apparatus.

Figure 8:
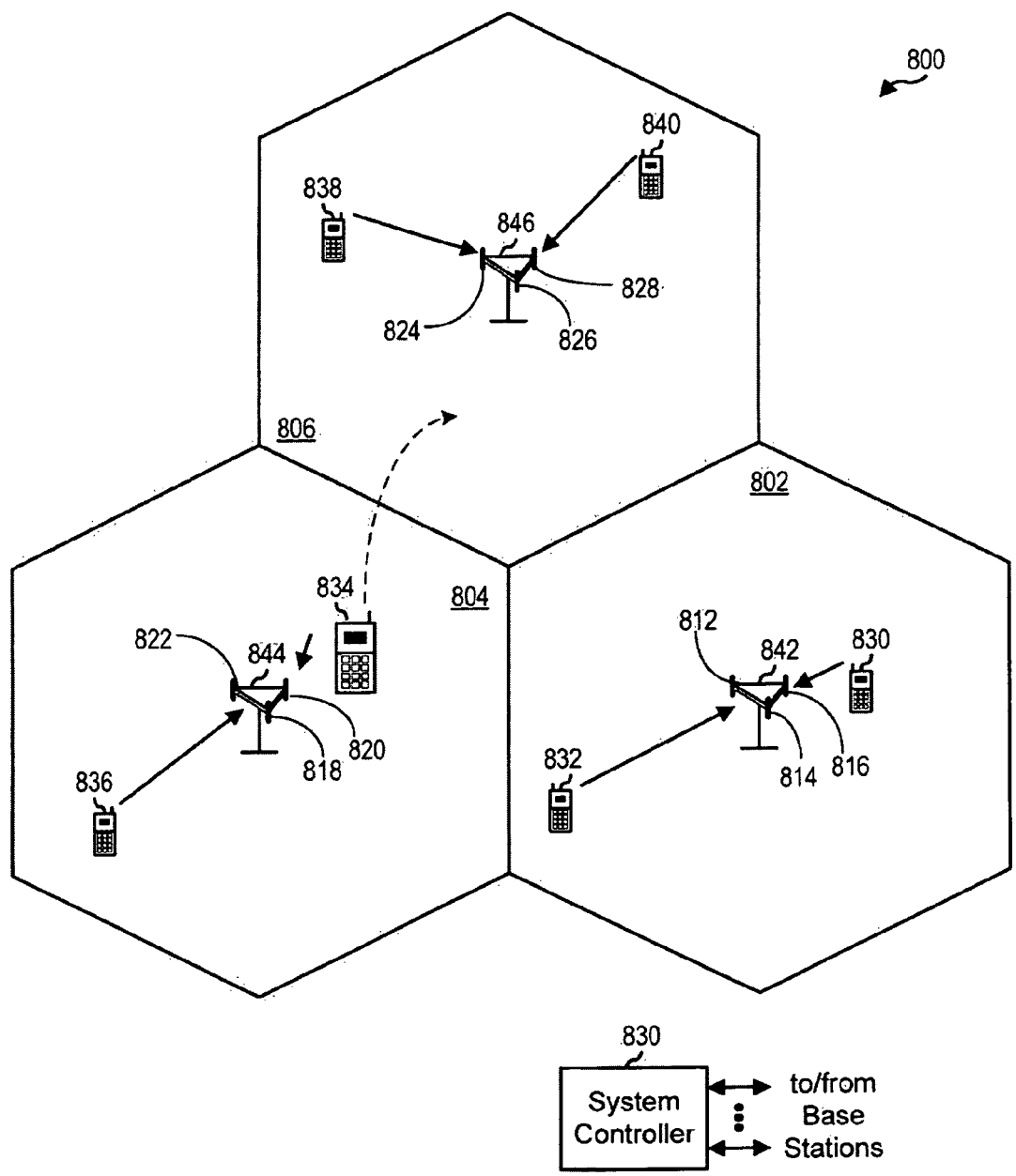
FIG. 8 illustrates a multiple access wireless communication system.

Referring to FIG. 8, a multiple access wireless communication system 800 is illustrated. The multiple access wireless communication system 800 includes multiple cells, including cells 802, 804, and 806. In the aspect the system 800, the cells 802, 804, and 806 may include a Node B that includes multiple sectors. The multiple sectors can be formed by groups of antennas with each antenna responsible for communication with UEs in a portion of the cell. For example, in cell 802, antenna groups 812, 814, and 816 may each correspond to a different sector. In cell 804, antenna groups 818, 820, and 822 each correspond to a different sector. In cell 806, antenna groups 824, 826, and 828 each correspond to a different sector. The cells 802, 804 and 806 can include several wireless communication devices, e.g., User Equipment or UEs, which can be in communication with one or more sectors of each cell 802, 804 or 806. For example, UEs 830 and 832 can be in communication with Node B 842, UEs 834 and 836 can be in communication with Node B 844, and UEs 838 and 840 can be in communication with Node B 846.

Figure 9:
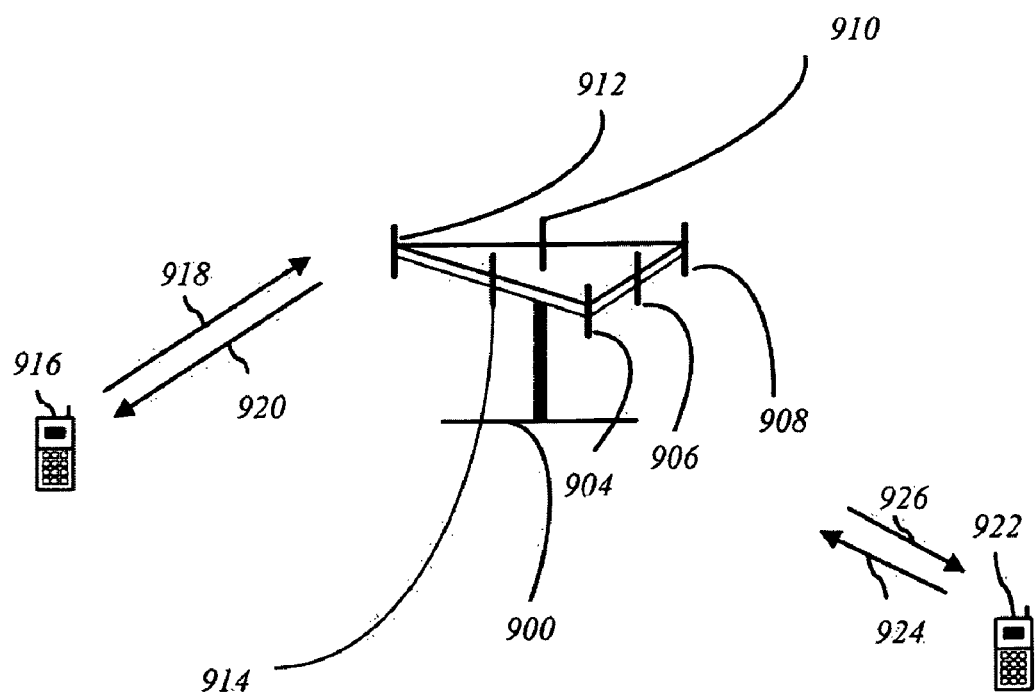
FIGS. 9 and 10 illustrate example communications systems that can be employed with wireless public warning systems.

Referring now to FIG. 9, a multiple access wireless communication system according to one aspect is illustrated. An access point 900 (AP) includes multiple antenna groups, one including 904 and 906, another including 908 and 910, and an additional including 912 and 914. In FIG. 9, only two antennas are shown for each antenna group, however, more or fewer antennas may be utilized for each antenna group. Access terminal 916 (AT) is in communication with antennas 912 and 914, where antennas 912 and 914 transmit information to access terminal 916 over forward link 920 and receive information from access terminal 916 over reverse link 918. Access terminal 922 is in communication with antennas 906 and 908, where antennas 906 and 908 transmit information to access terminal 922 over forward link 926 and receive information from access terminal 922 over reverse link 924. In a FDD system, communication links 918, 920, 924 and 926 may use different frequency for communication. For example, forward link 920 may use a different frequency then that used by reverse link 918.

Each group of antennas and/or the area in which they are designed to communicate is often referred to as a sector of the access point. Antenna groups each are designed to communicate to access terminals in a sector, of the areas covered by access point 900. In communication over forward links 920 and 926, the transmitting antennas of access point 900 utilize beam-forming in order to improve the signal-to-noise ratio of forward links for the different access terminals 916 and 924. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 10:
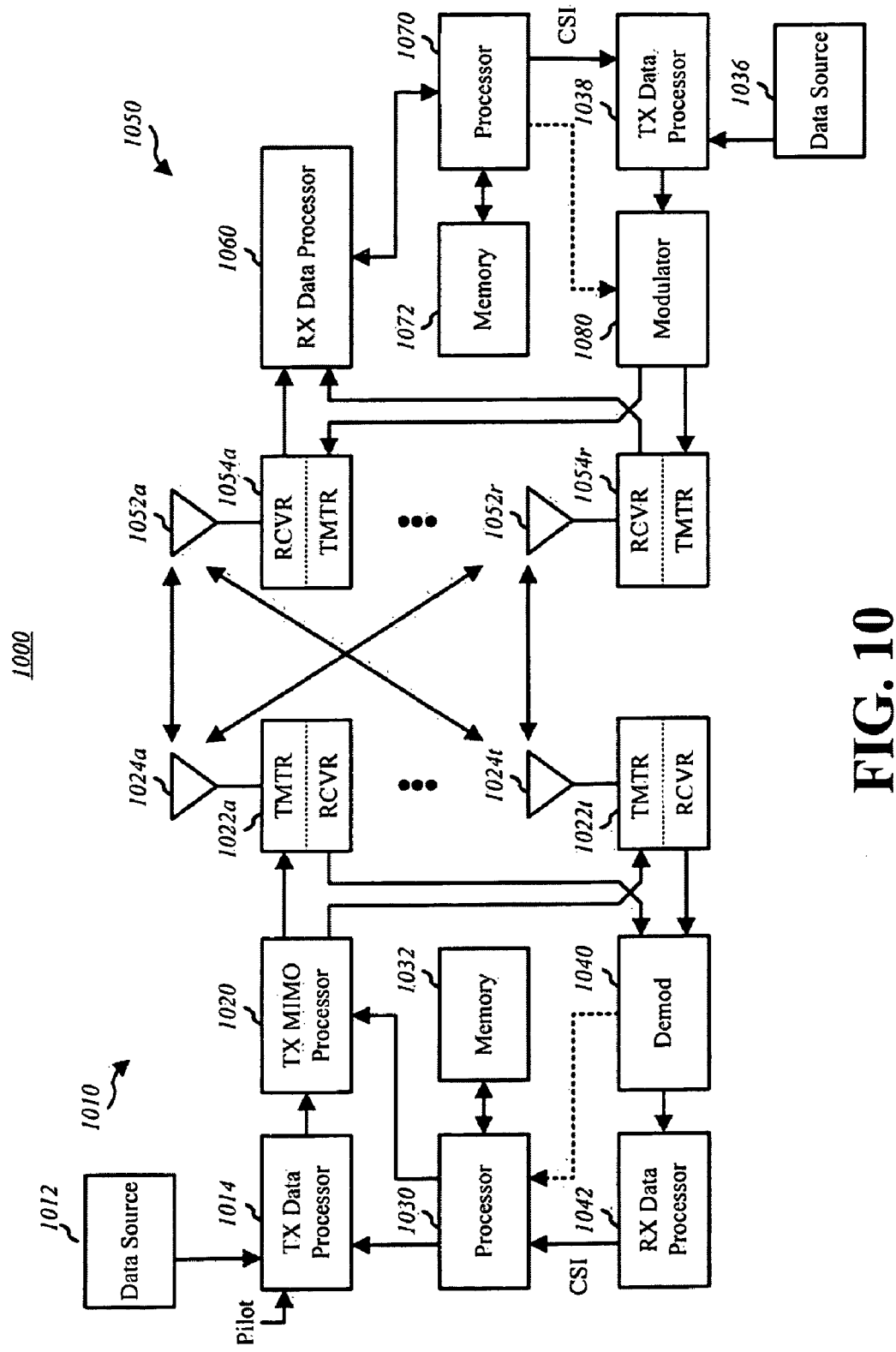

Referring to FIG. 10, a system 1000 illustrates a transmitter system 210 (also known as the access point) and a receiver system 1050 (also known as access terminal) in a MIMO system 1000. At the transmitter system 1010, traffic data for a number of data streams is provided from a data source 1012 to a transmit (TX) data processor 1014. Each data stream is transmitted over a respective transmit antenna. TX data processor 1014 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1030.

The modulation symbols for all data streams are then provided to a TX MIMO processor 1020, which may further process the modulation symbols (e.g., for OFDM). TX MIMO processor 1020 then provides NT modulation symbol streams to NT transmitters (TMTR) 1022a through 1022t. In certain embodiments, TX MIMO processor 1020 applies beam-forming weights to the symbols of the data streams and to the antenna from which the symbol is being transmitted.

Each transmitter 1022 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1022a through 1022t are then transmitted from NT antennas 1024a through 1024t, respectively.

At receiver system 1050, the transmitted modulated signals are received by NR antennas 1052a through 1052r and the received signal from each antenna 1052 is provided to a respective receiver (RCVR) 1054a through 1054r. Each receiver 1054 conditions (e.g., filters, amplifies, and down-converts) a respective received signal, digitizes the conditioned signal to provide samples, and further processes the samples to provide a corresponding; "received" symbol stream.

An RX data processor 1060 then receives and processes the NR received symbol streams from NR receivers 1054 based on a particular receiver processing technique to provide NT "detected" symbol streams. The RX data processor 1060 then demodulates, de-interleaves, and decodes each detected symbol stream to recover the traffic data for the data stream. The processing by RX data processor 1060 is complementary to that performed by TX MIMO processor 1020 and TX data processor 1014 at transmitter system 1010.

A processor 1070 periodically determines which pre-coding matrix to use (discussed below). Processor 1070 formulates a reverse link message comprising a matrix index portion and a rank value portion. The reverse link message may comprise various types of information regarding the communication link and/or the received data stream. The reverse link message is then processed by a TX data processor 1038, which also receives traffic data for a number of data streams from a data source 1036, modulated by a modulator 1080, conditioned by transmitters 1054a through 1054r, and transmitted back to transmitter system 1010.

At transmitter system 1010, the modulated signals from receiver system 1050 are received by antennas 1024, conditioned by receivers 1022, demodulated by a demodulator 1040, and processed by a RX data processor 1042 to extract the reserve link message transmitted by the receiver system 1050. Processor 1030 then determines which pre-coding matrix to use for determining the beam-forming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel mat transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations modifications and variations, that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for broadcasting messages in a wireless communication system, comprising:
    employing a paging channel to receive a broadcast message related to a detected public warning event on a wireless device;
    utilizing the broadcast message to trigger a warning message on the device; and
    utilizing the broadcast message to place the wireless device in listen mode to receive subsequent data regarding the public warning event, wherein the broadcast message indicates an earthquake, a tsunami event, a fire warning, a hurricane, a tornado, an outbreak of disease, a volcanic eruption, or an impending war.

2. The method of claim 1, wherein the public warning event is a natural disaster.

3. The method of claim 2, wherein the public warning event is detected from a primary earthquake warning.

4. The method of claim 1, wherein the subsequent data is broadcast via a cell broadcast service, a mobile television service, a digital video broadcast, or a mobile broadcast multimedia service.

5. The method of claim 1, wherein the broadcast message is a dedicated message or is received as a transmission indicator on an existing paging message.

6. The method of claim 5, further comprising employing a Mobile Country Code (MCC) and a Mobile Network Code (MNC) to activate the wireless device.

7. The method of claim 6, wherein the MCC is 901 and the MNC is 08.

8. A communications apparatus, comprising:
    a memory that retains code for receiving a warning message related to a detected public warning event across a paging channel of a wireless mobile device, the warning message employed to trigger a warning signal on the wireless mobile device and to place the wireless mobile device in listen mode to receive subsequent warning messages; and a processor that executes the code, wherein the message indicates an earthquake, a tsunami event, a fire warning, a hurricane, a tornado, an outbreak of disease, a volcanic eruption, or an impending war.

9. The communications apparatus of claim 8, wherein the subsequent warning messages are broadcast via a cell broadcast service, a mobile television service, a digital video broadcast, or a mobile broadcast multimedia service.

10. The communications apparatus of claim 8, wherein the warning message is received as a dedicated message or as a transmission indicator on an existing paging message that is employed to activate the wireless mobile device.

11. The communications apparatus of claim 10, further comprising a Mobile Country Code (MCC) and a Mobile Network Code (MNC) to activate the wireless device.

12. The communications apparatus of claim 11, wherein the MCC is 901 and the MNC is 08.

13. The communications apparatus of claim 8, wherein the warning signal is a vibration alarm or a sound alarm to alert a user of the wireless mobile device.

14. A communications apparatus, comprising:
means for receiving a paging event related to a detected public warning event that is generated to a plurality of non-subscribing mobile devices;
means for enabling a channel for subsequent messages in response to the paging event; and
means for warning a user in response to the paging event, wherein the message indicates an earthquake, a tsunami event, a fire warning, a hurricane, a tornado, an outbreak of disease, a volcanic eruption, or an impending war.

15. A non-transitory computer-readable product having stored thereon computer-executable code for:
receiving at least one paging channel event to activate a wireless mobile device that a public warning has occurred;
notifying a user of the public warning via an alarm; and
activating a subsequent channel to receive additional information related to the public warning, wherein the notifying and activating are performed in response to the paging channel event and wherein the public warning indicates an earthquake, a tsunami event, a fire warning, a hurricane, a tornado, an outbreak of disease, a volcanic eruption, or an impending war.

16. The computer-readable product of claim 15, further comprising generating the public warning from a detected natural disaster.

17. The computer-readable product of claim 15, further comprising receiving the paging channel event in accordance with a mobile country code and a mobile network code.

18. The computer-readable product of claim 15, further comprising receiving the paging channel event via a dedicated message.

19. A processor that executes the following code:
receiving a paging channel event that has been generated in response to a detected public warning event;
alerting a user of the paging channel event via a sound or a vibration alarm in response to the paging channel event; and
listening for subsequent messages for the public warning event via a broadcast service in response to the paging channel event, wherein the public warning event indicates an earthquake, a tsunami event, a fire warning, a hurricane, a tornado, an outbreak of disease, a volcanic eruption, or an impending war.

\* \* \* \* \*